US006526890B1

(12) United States Patent
Vidot et al.

(10) Patent No.: US 6,526,890 B1
(45) Date of Patent: Mar. 4, 2003

(54) PYROTECHNIC IGNITER AND ASSEMBLY PROCESS FOR SUCH AN IGNITER

(75) Inventors: Jean-Paul Vidot, Bordères (FR); Alain Rouer, Bours (FR)

(73) Assignee: Giat Industries (FR)

( * ) Notice: Subject to any disclaimer, the term of this patent is extended or adjusted under 35 U.S.C. 154(b) by 0 days.

(21) Appl. No.: 09/719,862

(22) PCT Filed: Jul. 7, 2000

(86) PCT No.: PCT/FR00/01962

§ 371 (c)(1),
(2), (4) Date: Dec. 18, 2000

(87) PCT Pub. No.: WO01/06202

PCT Pub. Date: Jan. 25, 2001

(30) Foreign Application Priority Data

Jul. 19, 1999 (FR) .............................. 99 09382

(51) Int. Cl.[7] .............................. F42B 3/12; F42B 3/18; F42B 3/195; F42C 19/12
(52) U.S. Cl. ............................ 102/202.12; 102/202.1; 102/202.5; 102/202.7; 102/202.9; 102/202.14; 102/206; 102/215

(58) Field of Search .................. 102/202.7, 202.5, 102/202.9, 202.12, 202.14

(56) References Cited

U.S. PATENT DOCUMENTS

| 5,345,872 A | * | 9/1994 | Takahashi et al. ........ 102/202.7 |
| 5,423,261 A | * | 6/1995 | Bernardy et al. ....... 102/202.14 |
| 5,454,320 A | * | 10/1995 | Hilden et al. ............ 102/202.7 |
| 5,602,359 A | * | 2/1997 | Hambro et al. .......... 102/202.5 |
| 5,648,634 A | * | 7/1997 | Avory et al. ............. 102/202.5 |
| 6,155,171 A | * | 12/2000 | Haegeman et al. ...... 102/202.9 |
| 6,164,208 A | * | 12/2000 | Hsu et al. ................ 102/202.5 |
| 6,324,987 B1 | * | 12/2001 | Wier ....................... 102/202.5 |

* cited by examiner

Primary Examiner—Michael J. Carone
Assistant Examiner—H. A. Blackner
(74) Attorney, Agent, or Firm—Parkhurst & Wendel, L.L.P.

(57) ABSTRACT

A pyrotechnic igniter for adaptation to a specific gas generator or pyromechanism, the igniter including at least one pyrotechnic composition located inside a cartridge composed of a case extended by at least two pins. The cartridge is located in a casing including at least an upper shell joined to a lower shell, the upper shell containing the cartridge and the lower shell having at least two protruding electrodes internally connected an internal circuit and to the pins.

9 Claims, 6 Drawing Sheets

PYROTECHNIC IGNITER AND ASSEMBLY PROCESS FOR SUCH AN IGNITER

FIELD OF THE INVENTION

The technical scope of the present invention is that of pyrotechnic igniters, that is to say components enabling a pyrotechnic effect to be transmitted in a pyrotechnic train.

BACKGROUND OF THE INVENTION

Igniters whose cartridge is at least partially made of a plastic material are known by patents EP600791 and EP711400.

These igniters are, for example, intended to activate a pyromechanism or else to ignite a gas generating composition in an automobile safety system.

Their external profile is thus of a globally cylindrical shape intended to co-operate with a matching cavity in the gas generator or in the pyromechanism. They also have a rim that acts as an abutment during assembly operations, such rim also providing sealing by acting as a bearing surface for an O-ring.

These igniter cartridges are generally made by injection or duplicate-moulding.

The disadvantage of such cartridges is that they are of a shape that is specific to a given gas generator or pyromechanism.

However, there are different types of gas generators and pyromechanisms are available on the market and the attachment interfaces for the igniters are not, at present, standardised.

It is thus essential for the igniter production line to be specially adapted for each customer's order so as to carry out duplicate-moulding of specific dimensions.

This results in an increase in production costs.

SUMMARY OF THE INVENTION

The aim of the present invention is to propose an igniter as well as an assembly process for such an igniter that does not suffer from such drawbacks.

Thus the igniter according to the invention is of a structure that allows it to be inexpensively manufactured for a given external geometry.

The assembly process according to the invention also allows igniters that have various external dimensions to be inexpensively manufactured.

The process according to the invention also allows for the easy integration of electronic components providing complementary functions (electromagnetic or electrostatic protection, logic circuits, firing device . . . ).

Thanks to the invention, the inner part of the igniter is the same whatever the outer geometry of the whole component. It is therefore possible to mass produce the essential and a priori the most expensive part of the igniter, that is to say the cartridge enclosing the pyrotechnic composition as well as the ignition means.

The igniter is thereafter customised by being installed in a casing having the external dimensions required for a specific customer.

Thus the subject of the invention is a pyrotechnic igniter comprising at least one pyrotechnic composition placed inside a cartridge composed of a substantially cylindrical case extended by at least two pins, such igniter being characterised in that the cartridge is placed inside a casing formed by joining at least two shells, such casing delimiting an inner volume accommodating the cartridge.

The casing is advantageously formed by joining an upper shell, delimiting the inner volume accommodating the cartridge, and a lower shell, provided with holes to allow the cartridge pins to protrude.

The casing can be formed by joining an upper shell, delimiting the inner volume accommodating the cartridge, and a lower shell provided with holes allowing two electrodes to protrude, both pins and electrodes being connected to a circuit placed in the inner volume.

The circuit can be carried by a card arranged perpendicularly to the pins and electrodes.

The card can be housed in a bore arranged in the lower shell.

The circuit can alternatively be housed in the upper shell.

Advantageously, the circuit will incorporate at least one component providing protection with respect to electromagnetic and/or electrostatic discharges.

The circuit can incorporate at least one component to decode a firing signal.

According to one characteristic of the invention, the casing has an outer profile enabling it to be attached to a gas generator or pyromechanism.

The shells can be joined together by ultrasonic sealing.

A further subject of the invention is an assembly process for a pyrotechnic igniter that allows it to be adapted to a specific gas generator or pyromechanism, such process being characterised in that it comprises the following steps:

firstly, an igniter cartridge is manufactured incorporating a substantially cylindrical case extended by at least two pins, secondly, at least one casing is manufactured that has an outer profile allowing it to be adapted to a specific gas generator or pyromechanism, such casing incorporating an upper shell and a lower shell, said shells delimiting an inner volume to accommodate the cartridge, the cartridge is placed in the casing, the two shells forming the casing are joined together.

According to one variant of the process, at least two casings can be manufactured, each having a different outer profile, and each incorporating an upper and lower shell, said shells delimiting an inner volume to accommodate the cartridge. In this case, a casing will be chosen that has an outer profile corresponding to the gas generator or pyromechanism to which the igniter is to be adapted. The cartridge will then be placed inside the casing thus selected, and finally the two casing shells will be joined together.

The igniter cartridge can be attached to an electronic circuit before being housed in the selected casing.

BRIEF DESCRIPTION OF THE DRAWINGS

The invention will be better understood after reading the following description of the different embodiments, such description being made with reference to the appended drawings, in which.

DESCRIPTION OF THE PREFERRED EMBODIMENTS

Figure 1:
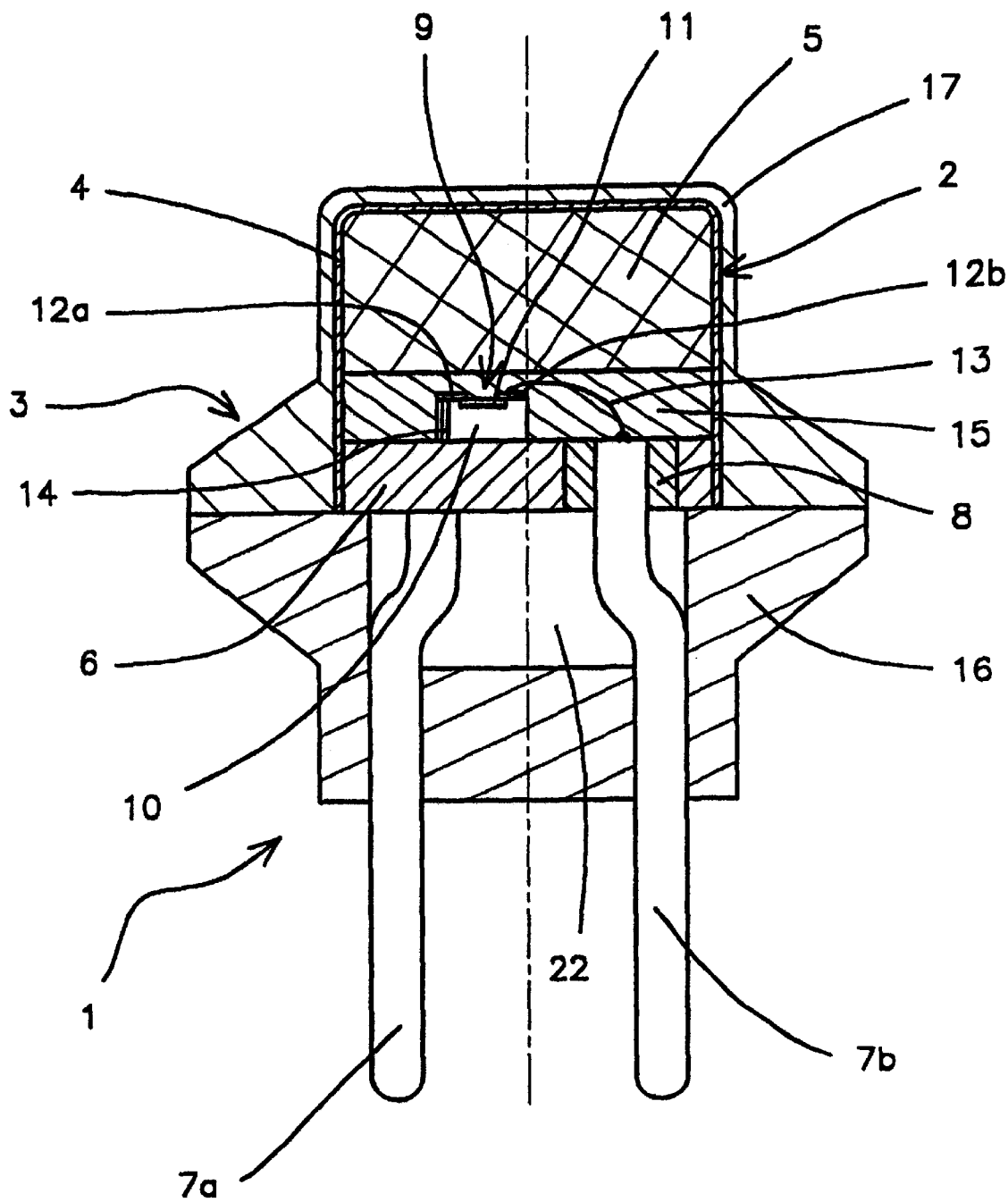
FIG. 1 shows a section view of an igniter according to the invention.

With reference to FIG. 1, a pyrotechnic igniter 1 according to the invention comprises an inner cartridge 2 placed inside a casing 3.

The cartridge 2 comprises a metallic case 4 (for example, made of stainless steel) that is substantially cylindrical and encloses a pyrotechnic igniting composition 5, for example a composition combining Boron and Potassium Nitrate in proportions in mass of 70% Boron to 30% Potassium Nitrate.

Case 4 is closed by a base that is also metallic and carries two electrodes 7a, 7b. Electrode 7a is welded to the base 6 and electrode 7b passes through the base 6 and is electrically insulated from it by an insulating sleeve 8 (for example, made of glass).

A semi-conductive card 9 is formed by a non-doped silicon-based insulating substrate 10 bonded to the base 6. This card incorporates a semi-conductive bridge 11, for example of doped silicon, that is partially covered by two conductive pads 12a, 12b, for example of aluminium.

The pads are spaced at between 60 and 100 micrometers and preferably around 80 micrometers. Pad 12b is connected to electrode 7b by a connecting wire 13 attached by welding. Pad 12a is connected to electrode 7a by means of the metallic base 6 through a semi-conductive well 14 (doped silicon) that passes through the insulating substrate 10.

Such as structure is described in detail in patent FR2720493.

A igniting pyrotechnic composition 15 covers the card 9 as well as the wire 13 and the welds. This composition is formed, for example, by combining Zirconium and Potassium Perchlorate in classical proportions of 60% in mass of Zirconium to 40% in mass of Perchlorate. It is ignited by the semi-conductive bridge and is intended to ignite the igniting composition 5.

The average particle size of the composition 15 will be selected of the same magnitude as that of the dimensions of the semi-conductive bridge. Such an arrangement ensures heat transfer by convection and/or projection during the temperature build-up of the semi-conductive bridge. Reliable ignition of the pyrotechnic composition is thus ensured by the semi-conductive bridge.

The dimensions of the bridge are generally speaking of around 50 micrometers×150 micrometers. Therefore, a particle size will be adopted for the composition that is less than or equal to 50 micrometers.

The base 6 is joined to the case 4, for example by laser welding.

The cartridge is loaded in the following manner:

First of all, the case 4 is loaded with the igniting composition 5 then with its priming composition 15, the two compositions being lightly compressed.

The base 6 carrying the semi-conductive card 9 is then put into place.

The base 6 is then welded to the case 4.

The cartridge 2 is placed inside a casing 3 that is formed by joining two shells: a lower shell 16 and an upper shell 17.

The two shells are made by injection of a plastic material, for example of the polyamide or polycarbonate type. They are joined together, for example by ultrasonic sealing.

Figure 2A:
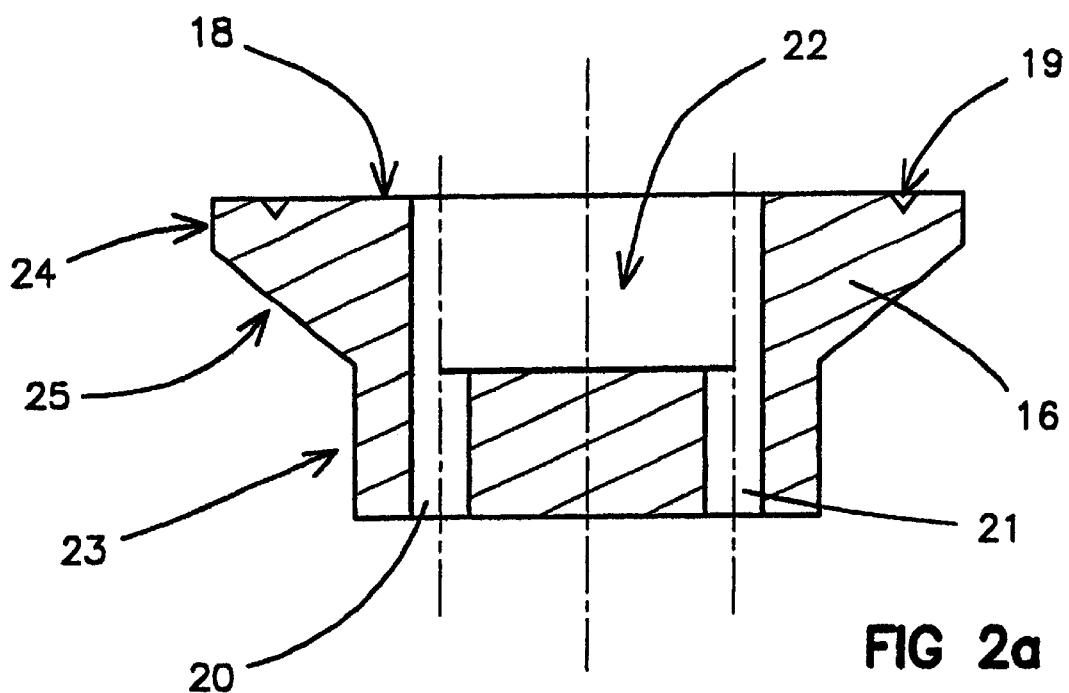
FIGS. 2a and 2b show the lower shell on its own, FIG. 2a being a section of FIG. 2b along plane AA.
Figure 2B:
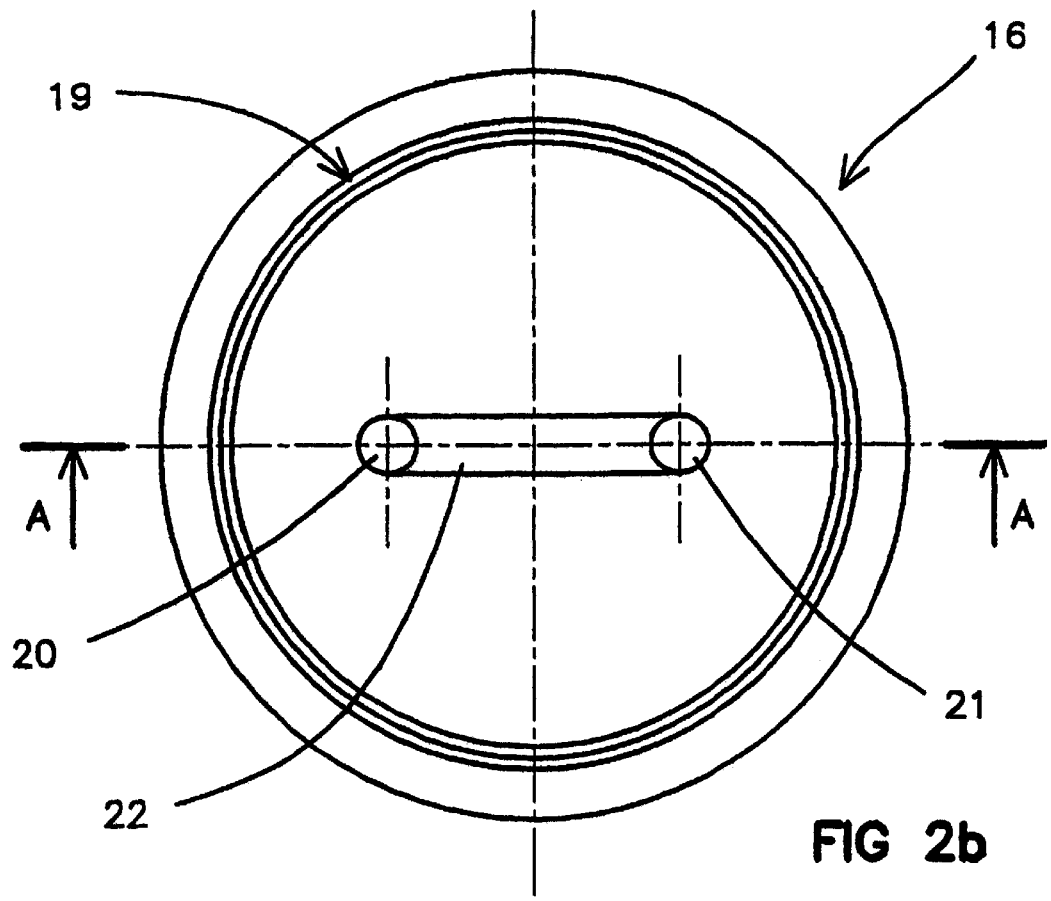

They delimit an inner volume accommodating the cartridge 2. The lower shell 16 is shown on its own in FIGS. 2a and 2b. It incorporates a bearing face 18 into which a circular groove 19 has been made and it is pierced by two holes 20, 21 connected by a notch 22.

Holes 20 and 21 are intended to allows pins 7a and 7b to pass through the cartridge 2. The notch 22 accommodates the curve of pins 7a and 7b.

The external profile of the lower shell 16 comprises two cylindrical surfaces 23, 24 connected to one another by a conical surface 25.

Figure 3:
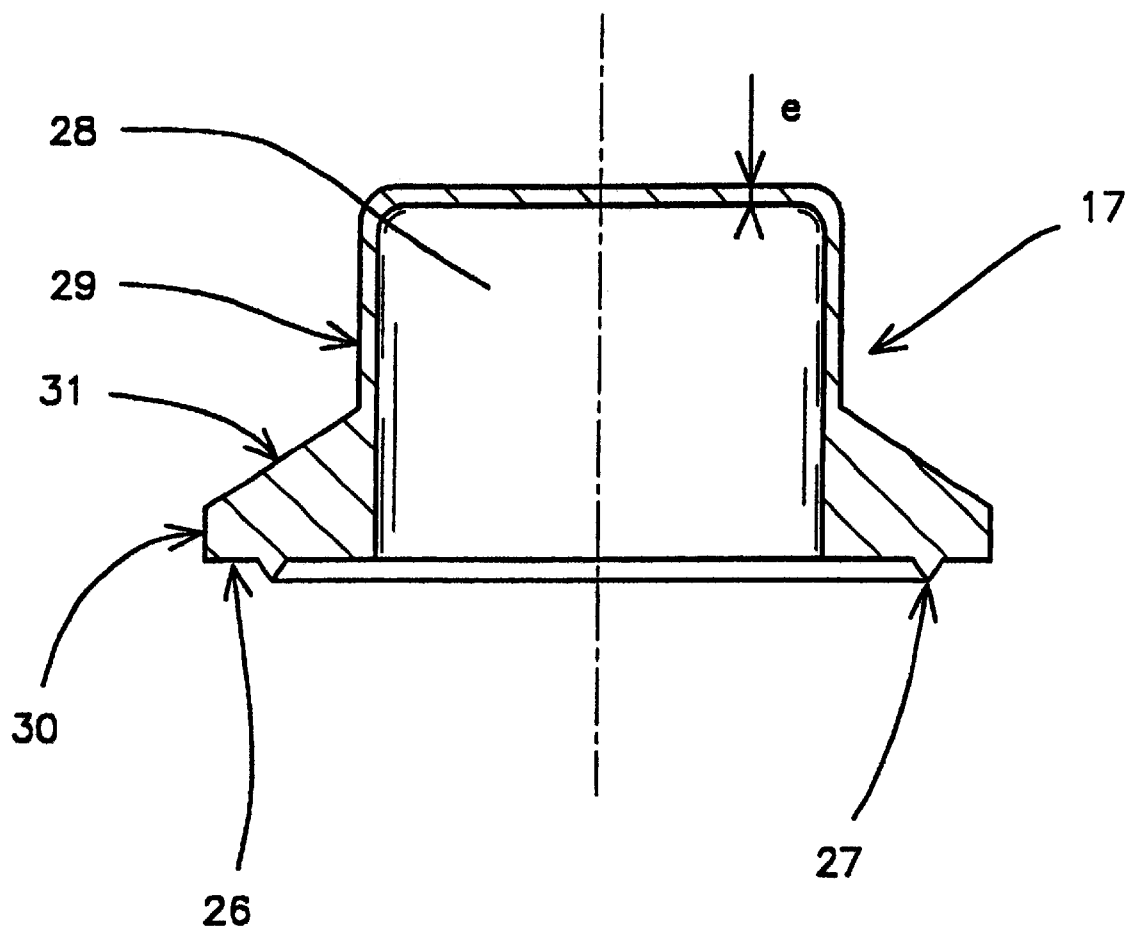
FIG. 3 is a section view of the upper shell on its own.

The upper shell 17 is shown on its own in FIG. 3. It incorporates a bearing face 26 that carries circular toothing 27 intended to co-operate with the groove 19 in the lower shell 16.

The upper shell 17 delimits an inner cylindrical volume 28 that is intended to accommodate the cartridge 2. This volume is thus of the same diameter as the external diameter of the cartridge 2 and is of a height equal to that of the cartridge.

The external profile of the upper shell 17 comprises two cylindrical surfaces 29, 30 connected to one another by a conical surface 31.

The thickness e of the upper shell is of around 0.5 mm. This shell is thin enough to be able to be fractured by the composition 5 igniting.

The igniter according to the invention is assembled as follows.

After the cartridge 2 has been made following the above-described steps, the cartridge is positioned on the lower shell 16 with pins 7a and 7b penetrating into holes 20 and 21. The base 6 of the cartridge 2 is thus pressing against the bearing face 18. The cartridge 2 is then topped by the upper shell 17. The two shells are then joined together by ultrasonic sealing.

Ultrasonic sealing is carried out in a known manner by applying the sonotrode of the welding apparatus to the conical profile 31 of the upper shell.

The vibrations produced by the sonotrode seal the contacting surfaces. The circular toothing 27 penetrates into the groove 19 during assembly allowing the stresses caused by the ultrasonic vibrations to be concentrated during the sealing operations. Heating at the contact point between groove and toothing is thus focussed enabling sealing to take place.

The two shells may naturally also be joined together by other means, for example by bonding.

After the two shells have been joined together, the assembly of the external profiles 25, 24, 30 and 31 for a rib that enables the igniter to be fastened onto a gas generator or pyromechanism (not shown).

Sealing of the igniter with respect to the exterior is ensured by laser sealing the cartridge 2. There are no particular precautions to be taken with respect to sealing during the assembly of the casing 3. Manufacturing is thus simplified.

The sealing of the igniter with respect to the pyromechanism and relative to the gases generated during operation is ensured by the base 6 pressing on the bearing face 18, such pressure having the additional effect of applying the base and the case 4 firmly onto the bearing face making the cartridge 2 penetrate slightly into the lower shell 16 thereby increasing gas tightness.

To further improve gas tightness, the external cylindrical surface of the case 4 will advantageously be given a tight fit in its housing in the upper shell 17, and pins 7a and 7b will also be tightly fitted into holes 20 and 21.

Additionally, one or several circular grooves (not shown) can be provided on bearing face 18, such grooves acting as baffles for the expanding gases or each accommodating an O-ring.

Different variants are possible without departing from the scope of the invention. It is thus possible for the semi-conductive card 9 to be replaced by other means of ignition known to the Expert, for example a hot wire or else an exploding wire or a resistive element arranged on a support according to the printed circuit technique.

It is also possible for the cartridge case to be made of a non metallic material.

The notch 22 can also possibly be replaced by a larger housing that could accommodate a filtering electronic component, for example a capacitor welded in parallel onto pins 7a and 7b. Such an arrangement ensures protection with respect to static electrical discharges (refer notably to U.S. Pat. No. 5,099,762).

Lastly, it is possible for igniters to be manufactured that have more than two pins.

One of the advantages of the igniter according to the invention lies in its simple structure allowing it to be manufactured at a reduced cost for a given external geometry.

The cartridges 2 enclosing the pyrotechnics can be produced in one place and the plastic casings elsewhere. It is therefore no longer necessary to carry out a duplicate moulding operation on a pyrotechnically active cartridge.

A further advantage of the igniter according to the invention lies in that igniters having different external diameters can be manufactured at a reduced cost.

Figure 4:
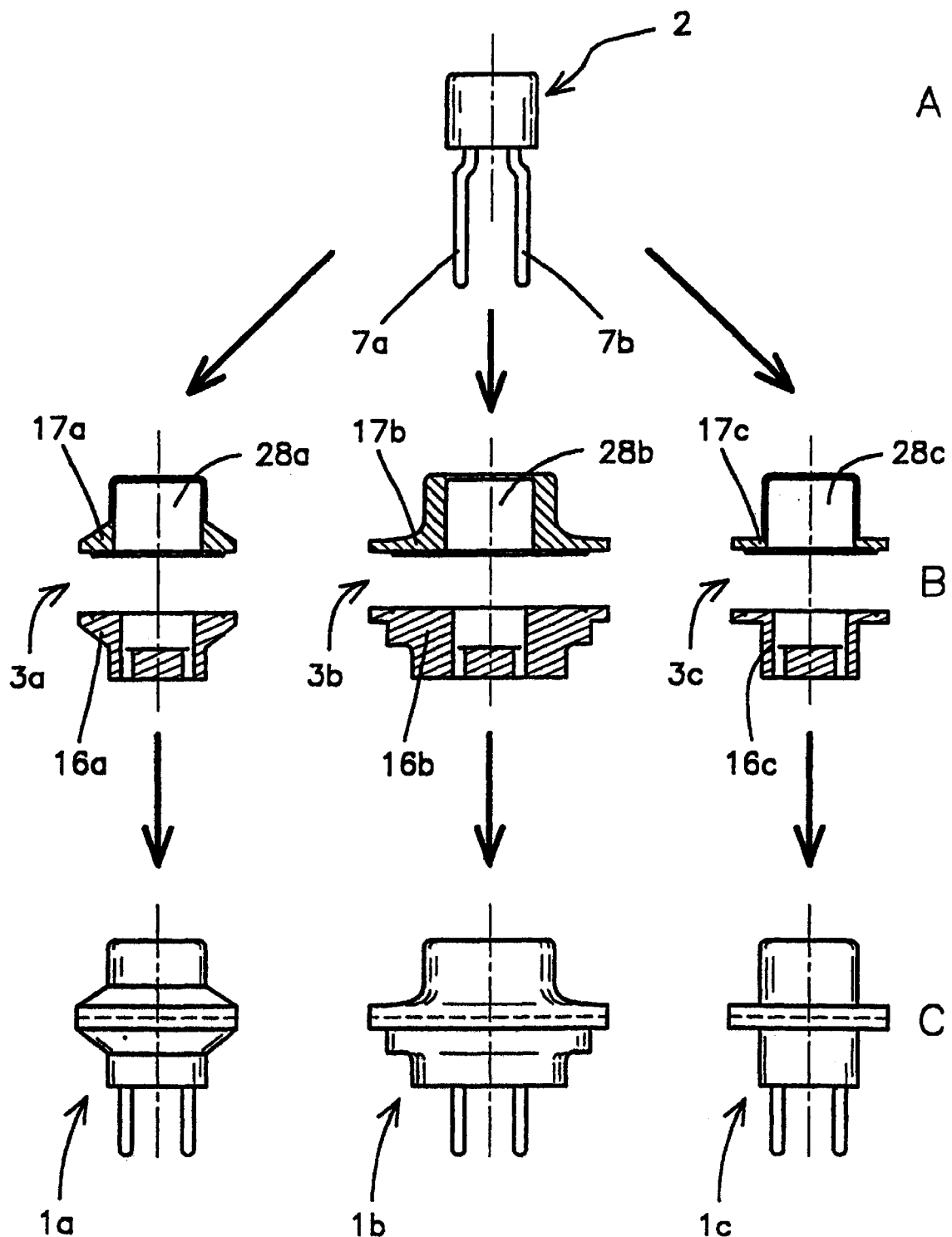
FIG. 4 is a schematic showing the different steps of an assembly process according to the invention.

FIG. 4 shows the different stages in the assembly process for a pyrotechnic igniter according to the invention.

Industrially speaking, it is necessary for pyrotechnic igniters to be manufactured that have different external shapes and/or dimensions according to the assembly interfaces of the safety systems to which they are to be adapted (gas generators for air bags, safety belt tighteners, embrittlement devices for example for car pedals, divers pyromechanisms . . . ).

By way of a non limiting example three different forms of igniters are shown here as 1a, 1b and 1c.

Following the process according to the invention these three forms are easily manufactured at a reduced cost since they all incorporate the same cartridge 2 enclosing the pyrotechnic compositions as well as the igniting means (semi-conductive card or hot wire).

Thus, to make a pyrotechnic igniter that can be adapted to a specific gas generator, an igniter cartridge 2 is manufactured first of all that incorporates a substantially cylindrical case extended by two pins (step A).

The shells enabling the required casing to be defined for the final igniter are manufactured separately.

Thus, for step B three separate sets of shells (16a/17a, 16b/17b, 16c/17c) are presented.

The shells all have in common the fact that they delimit an identical inner volume 28a, 28b, 28c enabling them to accommodate the same cartridge 2.

Thus, the cartridge can be indifferently adapted to any of casings 3a, 3b or 3c.

According to the client's needs, a casing will be chosen that has an external profile matching the gas generator or pyromechanism onto which it must be adapted.

The cartridge is placed in the selected casing and the two shells of the casing are joined together to make the required igniter 1a, 1b or 1c.

It is thus possible for large quantities of identical pyrotechnic cartridges 2 to be made.

It is only during assembly that the igniter will be customised by adapting it to a casing 3 having a specific external geometry required by a client.

The most expensive part of the igniter (the pyrotechnic system) can thus be manufactured in large quantities since it is only afterwards that it will be integrated into a specific casing adapted to the client's requirements.

Production costs for pyrotechnic igniters are thus substantially reduced.

Figure 5:
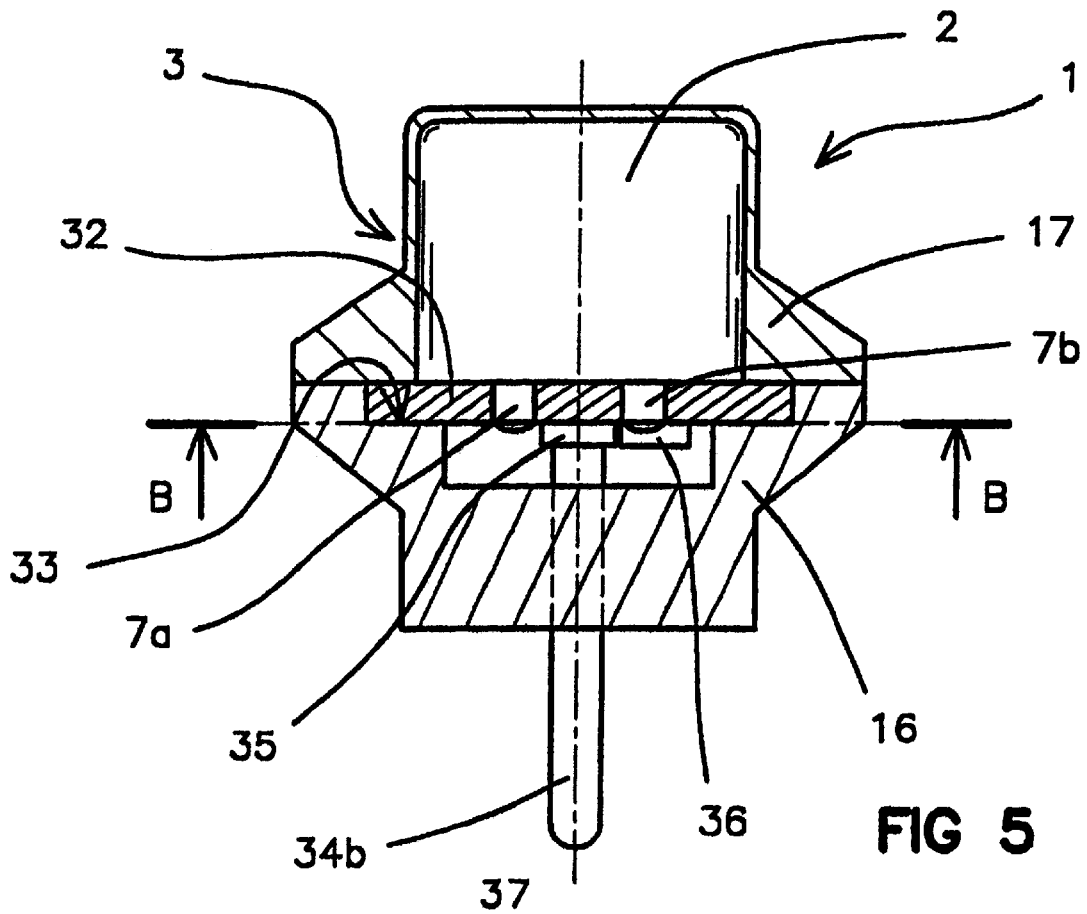
FIGS. 5 and 6 show an igniter according to a second embodiment, FIG. 5 being a partial longitudinal section along plane CC in FIG. 6 and said FIG. 6 being a transversal section of FIG. 5 along plane BB.
Figure 6:
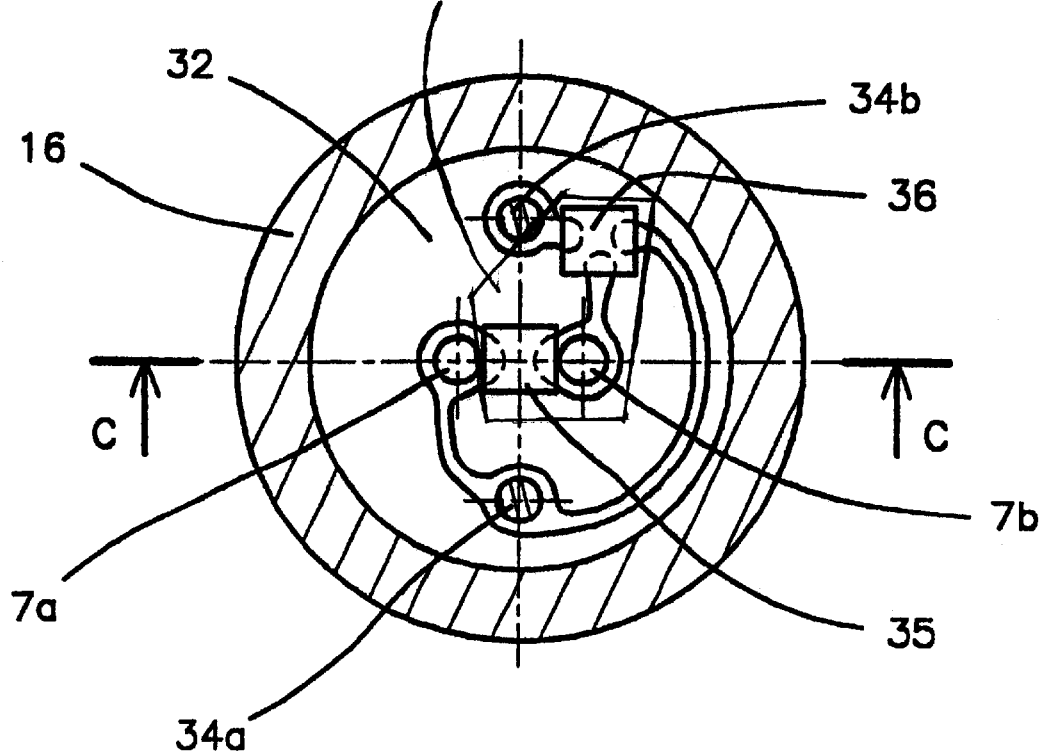

FIGS. 5 and 6 show another embodiment of an igniter according to the invention.

This igniter 1 also comprises a cartridge 2 enclosing the pyrotechnic composition or compositions, such cartridge being placed inside a casing 3 formed by joining two shells 16 and 17 together.

For the sake of clarity, the cartridge 2 is not shown on the figure as a section view.

This igniter differs from that shown in FIG. 1 in that the pins 7a and 7b of the cartridge do not protrude from the casing 3. These pins are welded to an electronic circuit that, in this case, is located on printed circuit card 32 of a circular shape housed in a matching bore 33 that is a countersink arranged in the lower shell 16.

The lower shell 16 is provided with holes that allow two connecting electrodes 34a, 34b to pass through. These electrodes are also welded to the printed circuit 32.

The printed circuit card 32 allows the pins 7a and 7b to be electrically connected to the connecting electrodes 34a, 34b. It can advantageously be fitted with the electronic components that ensure various functions: protection with respect to electromagnetic waves and/or electrostatic discharges, introduction of a logic function notably the coding of the igniter and means allowing this code to be compared with a coded signal to trigger firing (decoding), electrical power storage capacitor.

By way of a non limiting example, FIGS. 5 and 6 show printed circuit card 32 having thereon a capacitor 35 mounted in parallel between pins 7a and 7b and ensuring protection against electrostatic discharges (a value of between 0.1 and 10 microfarads will be selected for the capacitor capacitance).

The circuit shown also incorporates an integrated circuit 36 that receives signals coming from the two electrodes 34a, 34b that only supply pin 7b if a code corresponding to that of the igniter is transmitted by the connecting electrodes.

Such a logic circuit is well know to the Expert and will not be described here in any further detail.

The active or passive circuits will preferably be surface mounted components in order to limit the space taken up by the circuit and to reduce assembly costs.

A radio frequency filter can also be arranged onto the circuit 32 that notably combines resistors, inductive resistors and capacitors.

This igniter is assembled in accordance with the previously described assembly process.

The cartridge 2 is made separately from the casing 3 formed of two shells 16 and 17. The shells are defined such that they have an inner volume able to accommodate the cartridge 2 as well as the printed circuit 32. The external profile of the shells will be adapted according to the specific needs of the client.

In the specific case of this variant, the printed circuit 32 carrying the two electrodes 34a, 34b is also made.

The cartridge 2 and circuit 32 carrying the electrodes 34a, 34b are welded together, then the assembly thus formed is placed into the casing 3.

Lastly, the two shells 16 and 17 are joined together, for example by ultrasonic sealing.

As in the previous example, sealing means such as O-rings can be placed between the circuit 32 and the lower shell.

Figure 7:
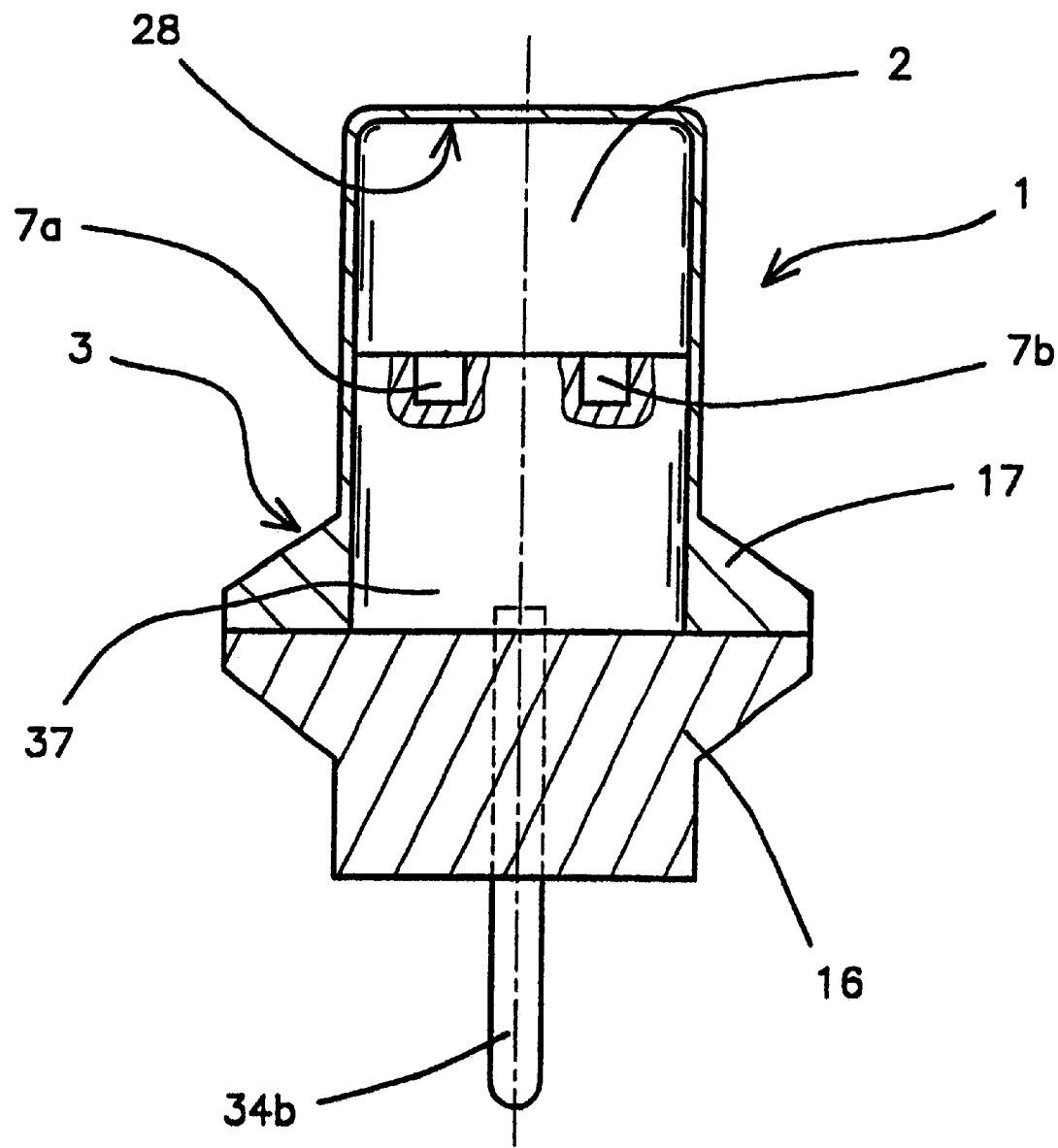
FIG. 7 shows a partial longitudinal section of an igniter according to a third embodiment.

FIG. 7 shows another embodiment of an igniter according to the invention.

This embodiment also incorporates a cartridge 2 (not shown in detail) that encloses the pyrotechnic composition or compositions and is placed inside a casing 3 formed by joining together two shells 16 and 17.

Pins 7a and 7b of the cartridge do not protrude from the casing 3, but are attached to an electronic circuit 37 shown here in a cylindrical form and housed in the inner volume 28 of the upper shell 17.

This circuit is not shown in detail and can be defined such as to ensure the previously described functions (electrical protection, decoding of a firing signal, electrical energy supply . . . ).

The lower shell 16 is provided with holes allowing the two electrodes 34a, 34b, which are also connected to the electronic circuit 37, to protrude.

According to the axial space taken up by the electronic circuit 37 it is possible thanks to the assembly process according to the invention for an igniter to be made at a very reduced cost. In fact, the cartridge 2 is identical to that shown in reference to FIG. 5. It is therefore enough to manufacture an upper shell 17 having a suitable shape to accommodate both the cartridge 2 and the circuit 37.

By way of a variant, such a cylindrical circuit can be replaced by a plane printed circuit arranged in parallel to pins 7a and 7b.

What is claimed is:

1. A pyrotechnic igniter comprising:
   a cartridge comprising a substantially cylindrical case extended by at least two pins;
   at least one pyrotechnic composition located inside said cartridge; and
   a casing comprising at least an upper shell jointed to a lower shell, the upper shell delimiting an inner volume containing said cartridge and the lower shell having holes with at least two electrodes protruding therethough from the inner volume to an exterior surface of the lower shell, said pins and said electrodes being connected to a circuit located in said inner volume.

2. A pyrotechnic igniter according to claim 1, wherein said circuit 37 is located on a card 32 perpendicular to the pins (7a, 7b) and electrodes (34a, 34b).

3. A pyrotechnic igniter according to claim 2, wherein card is located in a bore (33) located in the lower shell (16).

4. A pyrotechnic igniter according to claim 1, wherein said circuit (37) is located in said upper shell(17).

5. A pyrotechnic igniter according to claim 1, wherein the circuit 37 comprises at least one component (35) providing protection with respect to electromagnetic and/or electrostatic discharges.

6. A pyrotechnic igniter according to claim 1, wherein the circuit 37 comprises at least one component (36) to decode a firing signal.

7. A pyrotechnic igniter according to claim 1, wherein the casing has an outer profile for attachment to a gas generator or pyromechanism.

8. A pyrotechnic igniter according to claim 1, wherein the shells (16, 17) are joined together by ultrasonic sealing.

9. A pyrotechnic igniter according to claim 1, wherein the casing is formed by joining an upper shell, delimiting the inner volume accommodating the cartridge, and a lower shell, provided with holes to allow the cartridge pins to protrude.

* * * * *